US011923624B2

(12) United States Patent
Tachibana

(10) Patent No.: US 11,923,624 B2
(45) **Date of Patent: *Mar. 5, 2024**

(54) ANTENNA DEVICE AND ELECTRONIC APPARATUS

(71) Applicant: Murata Manufacturing Co., Ltd., Nagaokakyo (JP)

(72) Inventor: Shinya Tachibana, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 352 days.

This patent is subject to a terminal disclaimer.

(21) Appl. No.: 17/356,569

(22) Filed: Jun. 24, 2021

(65) Prior Publication Data

US 2021/0320418 A1 Oct. 14, 2021

Related U.S. Application Data

(63) Continuation of application No. PCT/JP2021/000676, filed on Jan. 12, 2021.

(30) Foreign Application Priority Data

Jan. 28, 2020 (JP) ................................ 2020-011521

(51) Int. Cl.
*H01Q 9/04* (2006.01)
*H01Q 1/24* (2006.01)
*H01Q 21/28* (2006.01)

(52) U.S. Cl.
CPC ........... *H01Q 9/0414* (2013.01); *H01Q 1/243* (2013.01); *H01Q 21/28* (2013.01)

(58) Field of Classification Search
CPC .......... H01Q 1/243; H01Q 1/521; H01Q 5/40; H01Q 5/335; H01Q 5/378; H01Q 9/42; H01Q 9/0414; H01Q 21/28
See application file for complete search history.

(56) References Cited

U.S. PATENT DOCUMENTS

| | | | | |
|---|---|---|---|---|
| 7,088,307 | B2 * | 8/2006 | Imaizumi ................. | H03H 7/38 343/862 |
| 7,126,554 | B2 * | 10/2006 | Mohamadi ............... | H01Q 9/16 343/786 |
| 7,907,100 | B2 * | 3/2011 | Mortazawi ............. | H01Q 21/08 333/139 |
| 10,079,587 | B2 * | 9/2018 | Ishizuka .................. | H03H 7/09 |

(Continued)

FOREIGN PATENT DOCUMENTS

| | | | |
|---|---|---|---|
| JP | 2013-026962 | A | 2/2013 |
| WO | 2012/153690 | A1 | 11/2012 |

(Continued)

OTHER PUBLICATIONS

Official Communication issued in International Patent Application No. PCT/JP2021/000676, dated Feb. 16, 2021.

*Primary Examiner* — Tung X Le
(74) *Attorney, Agent, or Firm* — Keating & Bennett, LLP

(57) ABSTRACT

An antenna device includes a first and second antennas. The first antenna includes a coupling element, a phase adjuster, and first and second radiating elements. The phase adjuster is provided to adjust a phase difference between signals of the first radiating element and the second radiating element in a communication band of the second antenna to be about 180°±45°.

20 Claims, 15 Drawing Sheets

101

(56) References Cited

U.S. PATENT DOCUMENTS

| | | | | |
|---|---|---|---|---|
| 11,495,884 | B2 * | 11/2022 | Onaka | H01Q 1/241 |
| 2013/0012144 | A1 * | 1/2013 | Besoli | H01Q 1/36<br>455/84 |
| 2014/0049440 | A1 | 2/2014 | Ueki et al. | |
| 2020/0288494 | A1 * | 9/2020 | Heo | H04W 72/20 |
| 2020/0373670 | A1 | 11/2020 | Nasu | |
| 2021/0273334 | A1 * | 9/2021 | Tachibana | H01Q 1/2283 |

FOREIGN PATENT DOCUMENTS

| | | | |
|---|---|---|---|
| WO | 2019/208253 | A1 | 10/2019 |
| WO | 2020/012885 | A1 | 1/2020 |
| WO | 2020/137375 | A1 | 7/2020 |

* cited by examiner

ANTENNA DEVICE AND ELECTRONIC APPARATUS

CROSS REFERENCE TO RELATED APPLICATIONS

This application claims the benefit of priority to Japanese Patent Application No. 2020-011521 filed on Jan. 28, 2020 and is a Continuation Application of PCT Application No. PCT/JP2021/000676 filed on Jan. 12, 2021. The entire contents of each application are hereby incorporated herein by reference.

BACKGROUND OF THE INVENTION

1. Field of the Invention

The present invention relates to an electronic apparatus having a communication function and an antenna device included in the electronic apparatus, and particularly, to an antenna device and an electronic apparatus that are used in a wide band.

2. Description of the Related Art

In recent years, there has been a demand for a wideband antenna device that covers communication bands over a wide band in response to expansion of communication bands to be used for communication.

As one of the techniques for expanding the band of the antenna device, a method according to the related art is known. In the method, a feed radiating element connected to a feeding circuit and a parasitic radiating element physically separated from the feeding circuit are provided, and the parasitic radiating element is coupled to the feed radiating element by electromagnetic field coupling, thus imparting characteristics of the parasitic radiating element to the characteristics of the feed radiating element (International Publication No. 2012/153690).

A system having a wide bandwidth for the fifth generation mobile communication system has recently been adopted for communication of mobile phone terminals. In the wide bandwidth, the frequency band of 3 GHz to 6 GHz band is regarded as important, and an antenna device to be applied to the frequency band is added to the terminals.

On the other hand, an antenna for Wi-Fi of a wireless LAN standard is also used in a wide band of the 5 GHz band.

The fifth generation mobile communication system is a radio access technology standardized by Third Generation Partnership Project (3GPP), and Band n79 among 3GPP designated frequency bands is 4.4 GHz to 5.0 GHz that is adjacent to the 5 GHz band used in a wireless LAN. Therefore, the wideband antenna applied to Band n79 and the antenna used in the wireless LAN require antenna isolation.

Further, in recent mobile phone terminals, due to introduction of multiple-input and multiple-output (MIMO) and so on in addition to expansion of a communication bandwidth, a situation has been increasing in which a large number of antennas are provided in a mobile phone terminal and thus antenna isolation is required between those antennas.

The wideband antenna device including the feed radiating element and the parasitic radiating element has excellent wideband characteristics, but due to its wideband characteristics, it is difficult to ensure the isolation with respect to other antennas having an adjacent frequency band.

SUMMARY OF THE INVENTION

Preferred embodiments of the present invention provide antenna devices in each of which the isolation is ensured between a wideband antenna and an antenna for a frequency band that is adjacent to a frequency band used by the wideband antenna, and electronic apparatuses including such antenna devices.

An antenna device according to a preferred embodiment of the present invention includes a first antenna and a second antenna, wherein the first antenna includes a coupling element including a primary coil and a secondary coil, a first radiating element connected to the primary coil, a second radiating element connected to the secondary coil, and a phase adjuster connected to the second radiating element, the second antenna includes a third radiating element, a first feeding circuit is connected to a primary coil side, a second feeding circuit is connected to the third radiating element, and the phase adjuster is provided to adjust a phase difference between signals of the first radiating element and the second radiating element in a communication band of the second antenna to be within a range of about 180°±45°.

An electronic apparatus according to a preferred embodiment of the present invention includes an antenna device, a first feeding circuit connected to the antenna device, and a second feeding circuit connected to the antenna device, wherein the antenna device includes a first antenna and a second antenna, the first antenna includes a coupling element including a primary coil and a secondary coil, a first radiating element connected to the primary coil, a second radiating element connected to the secondary coil, and a phase adjuster connected to the second radiating element, the second antenna includes a third radiating element, a first feeding circuit is connected to a primary coil side, a second feeding circuit is connected to the third radiating element, and the phase adjuster is provided to adjust a phase difference between signals of the first radiating element and the second radiating element in a communication band of the second antenna to be within a range of about 180°±45°.

According to preferred embodiments of the present invention, it is possible to obtain antenna devices each having wideband characteristics and in each of which the isolation is ensured between two antennas to be used in frequency bands adjacent to each other, and electronic apparatuses including such antenna devices.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
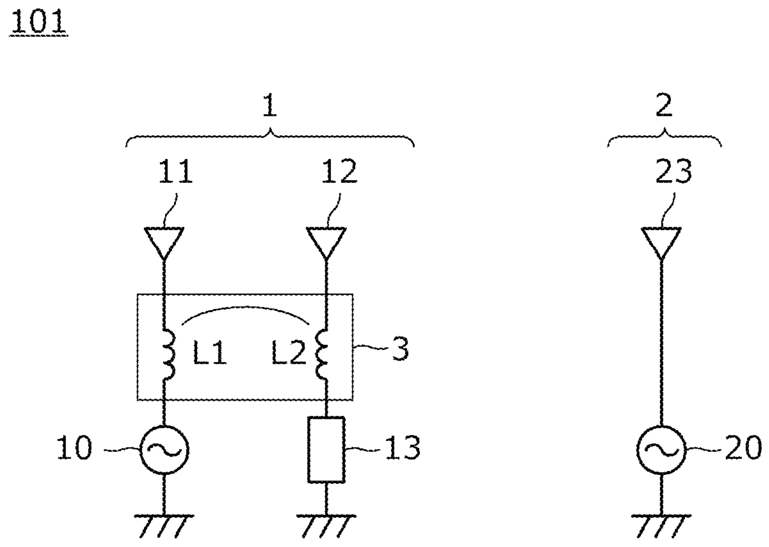
FIG. 1 is a circuit diagram of an antenna device 101 according to a first preferred embodiment of the present invention.

Hereinafter, preferred embodiments of the present invention will be described by providing several specific examples with reference to the accompanying drawings. In the drawings, the same reference numerals denote the same or corresponding portions. In consideration of ease of description or ease of understanding of main points, and for convenience of description, preferred embodiments are described separately, but partial substitutions or combinations of configurations described in different preferred embodiments are possible. In a second preferred embodiment and subsequent preferred embodiments, descriptions of matters common to those in a first preferred embodiment will be omitted, and only different points will be described. In particular, similar advantageous actions and effects achieved by similar configurations will not be described successively for each preferred embodiment.

First Preferred Embodiment

Figure 2A:
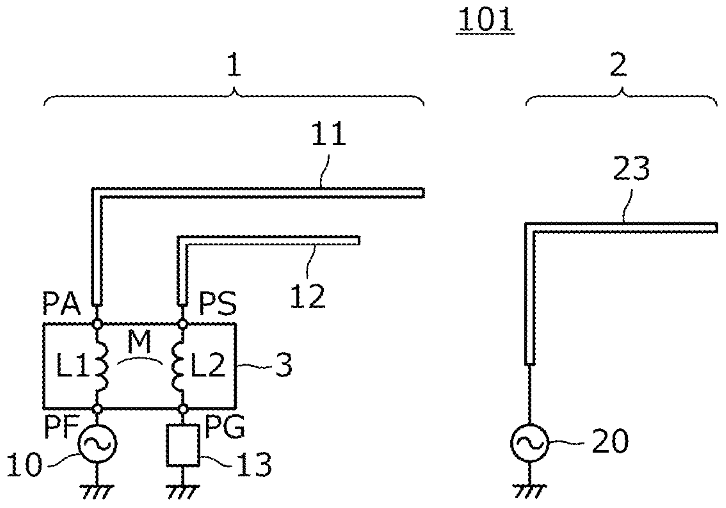
FIGS. 2A and 2B are circuit diagrams of the antenna device 101 including a schematic illustration of each radiating element.
Figure 2B:
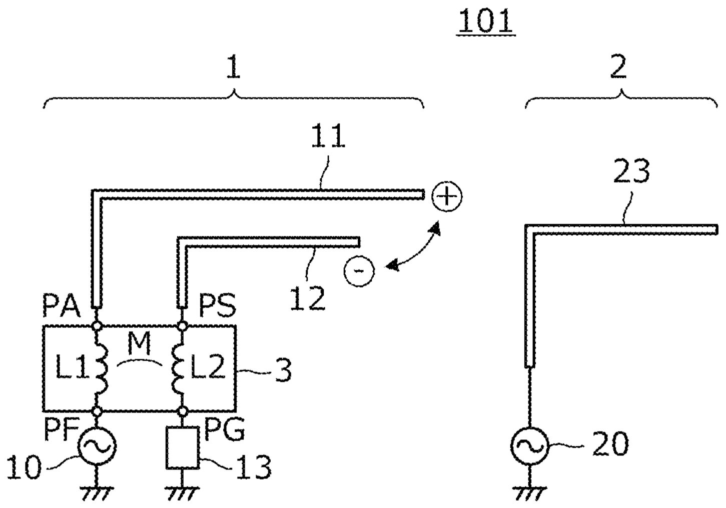

FIG. 1 is a circuit diagram of an antenna device 101 according to a first preferred embodiment of the present invention. FIGS. 2A and 2B are circuit diagrams of the antenna device 101 including schematic illustration of each radiating element.

The antenna device 101 includes a first antenna 1 and a second antenna 2. The antenna device 101 includes a first feeding circuit 10 connected to a feeder of the first antenna 1, and a second feeding circuit 20 connected to a feeder of the second antenna 2.

The first antenna 1 includes a coupling element 3, a phase adjuster 13, a first radiating element 11, and a second radiating element 12. The coupling element 3 includes a primary coil L1 and a secondary coil L2 that are coupled to each other by magnetic field coupling. The coupling element 3 includes a feeding terminal PF, a first radiating element connection terminal PA, a second radiating element connection terminal PS, and a ground terminal PG.

The primary coil L1 is connected in series between the first feeding circuit 10 and the first radiating element 11. The first feeding circuit 10 is connected between the ground which is the reference potential end and the primary coil L1. The secondary coil L2 is connected in series between the phase adjuster 13 and the second radiating element 12. Further, the phase adjuster 13 is connected between the secondary coil L2 and the ground. The phase adjuster 13 is a circuit that adjusts a phase difference between the ground and the secondary coil L2, thus adjusting the difference in a feeding phase of the second radiating element 12 with respect to the first radiating element 11.

The second antenna 2 includes a third radiating element 23. The second feeding circuit 20 is connected between the third radiating element 23 and the ground.

In the example illustrated in FIGS. 2A and 2B, all of the first radiating element 11, the second radiating element 12, and the third radiating element 23 are, for example, monopole antennas having a ¼ wavelength or inverted L-shaped antennas that are bent in the middle thereof. The first antenna 1 is, for example, an antenna used in Band n79 among the designated frequency bands of 3GPP, and the second antenna 2 is, for example, a Wi-Fi antenna used in an approximate 5 GHz band of the IEEE 802.11 standard.

Figure 3:
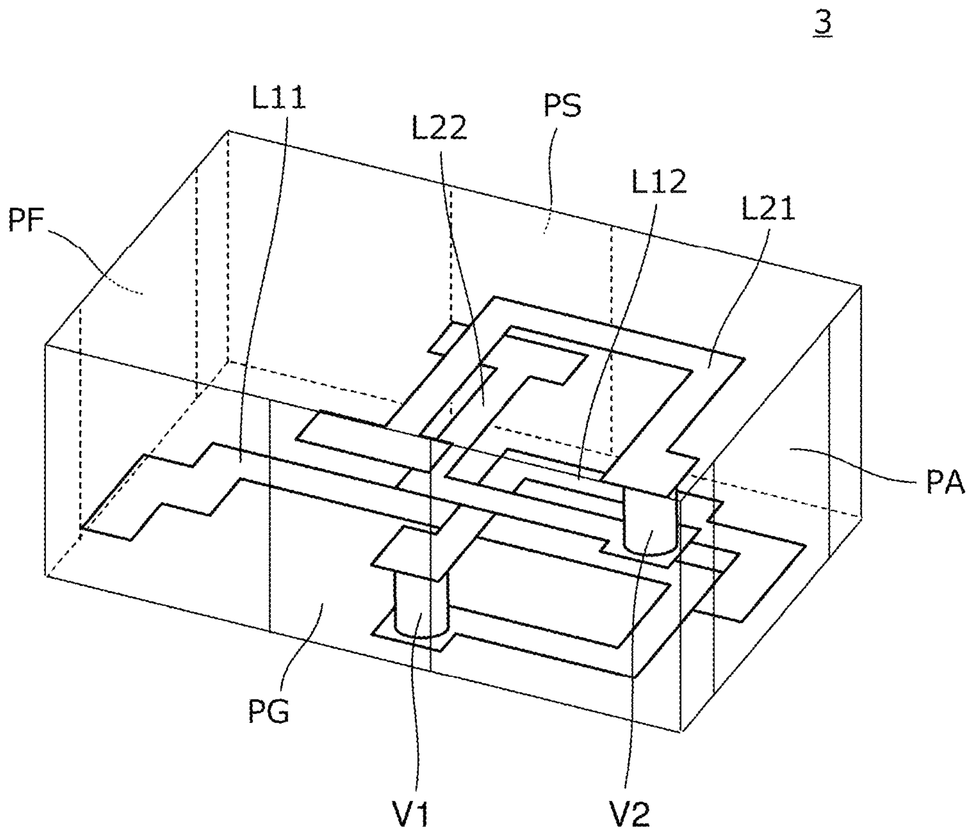
FIG. 3 is a perspective view illustrating an internal structure of a coupling element 3.

FIG. 3 is a perspective view illustrating an internal structure of the coupling element 3. In the present preferred embodiment, the primary coil L1 and the secondary coil L2 are provided in a single element, for example. The coupling element 3 is a multilayer body including a plurality of insulating base materials on which predetermined conductor patterns are provided. In FIG. 3, conductor patterns L11 and L12 and a via conductor V1 which connects the conductor patterns L11 and L12 on different layers define the primary coil L1 with one or more turns. Further, conductor patterns L21 and L22 and a via conductor V2 which connects the conductor patterns L21 and L22 of different layers define the secondary coil L2 with one or more turns. The coil openings of the primary coil L1 and the secondary coil L2 are coaxially provided, and the primary coil L1 and the secondary coil L2 are coupled by magnetic field coupling.

In the first antenna 1, the resonant frequency determined by the first radiating element 11, self-inductance of the primary coil L1, and mutual inductance of the coupling element 3 is represented by a first resonant frequency f1, and the resonant frequency determined by the second radiating element 12, self-inductance of the secondary coil L2, the mutual inductance of the coupling element 3, and the phase adjuster 13 is represented by a second resonant frequency f2. Further, the resonant frequency determined by the second antenna 2 is represented by a third resonant frequency f3. These three resonant frequencies have a relationship of f1<f2<f3, and the second resonant frequency f2 is located at the high frequency end of the communication band of the first antenna 1. That is, the first antenna 1 has an antenna characteristic with a gain in a wide band ranging from the first resonant frequency f1 to the second resonant frequency f2. The second antenna 2 has an antenna characteristic with a gain in a frequency band including the third resonant frequency f3.

Further, in the antenna device 101, the phase difference between signals of the first radiating element 11 and the second radiating element 12 in the communication band of the second antenna 2 is preferably within the range of about 180°±45°, for example.

Figure 29:
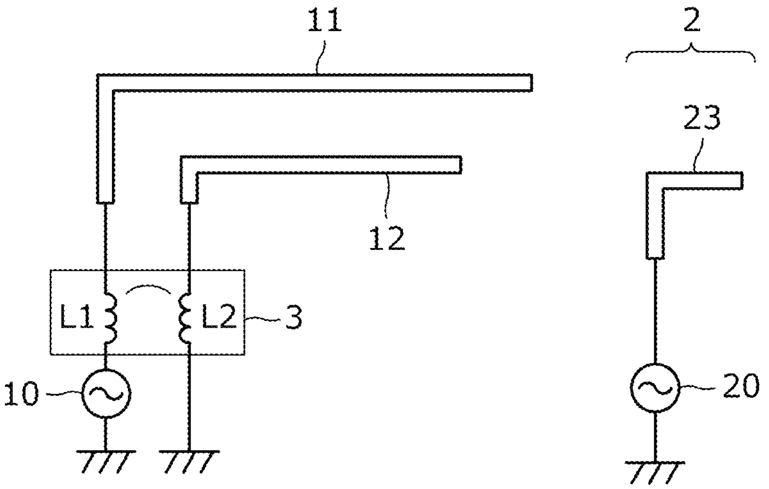
FIG. 29 is a circuit diagram of a wideband antenna as a comparative example.

Here, as a comparative example, a configuration of a wideband antenna and a second antenna 2 for Wi-Fi is illustrated in FIG. 29. The wideband antenna includes a coupling element 3, a first radiating element 11, and a second radiating element 12. The coupling element 3 includes a primary coil L1 and a secondary coil L2 that are coupled to each other by magnetic field coupling.

Figure 30:
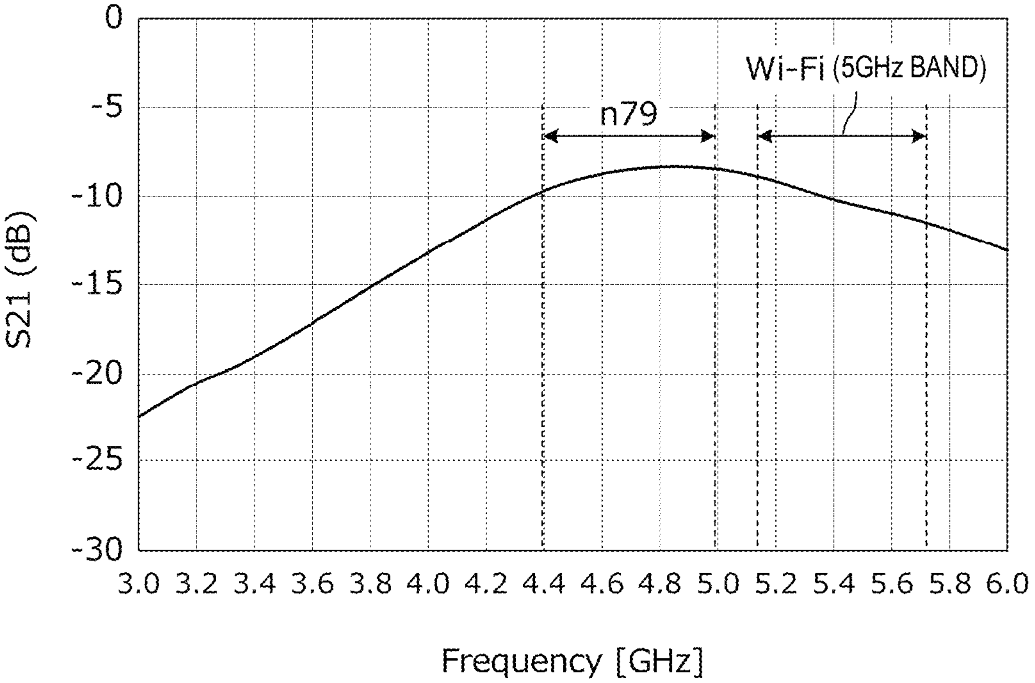
FIG. 30 is a graph showing frequency characteristics of a gain of the wideband antenna illustrated in FIG. 29.

FIG. 30 is a graph showing frequency characteristics of antenna-to-antenna isolation between the wideband antenna including the first radiating element 11 and the second radiating element 12 and the second antenna 2 for Wi-Fi including a third radiating element 23 as illustrated in FIG. 29. The wideband antenna is used in Band n79 and has a high gain over the wide band of about 4.4 GHz to about 5.0 GHz. However, Band n79 extends to the frequency band of the 5 GHz band (about 5.15 GHz to about 5.725 GHz) Wi-Fi antenna of the IEEE 802.11 standard, and therefore, the isolation is poor. As described above, when an antenna for the 5 GHz band of the IEEE 802.11 standard is adjacent to the wideband antenna used in Band n79, the isolation between the antenna for Band n79 and the above Wi-Fi antenna is not ensured.

Figure 4:
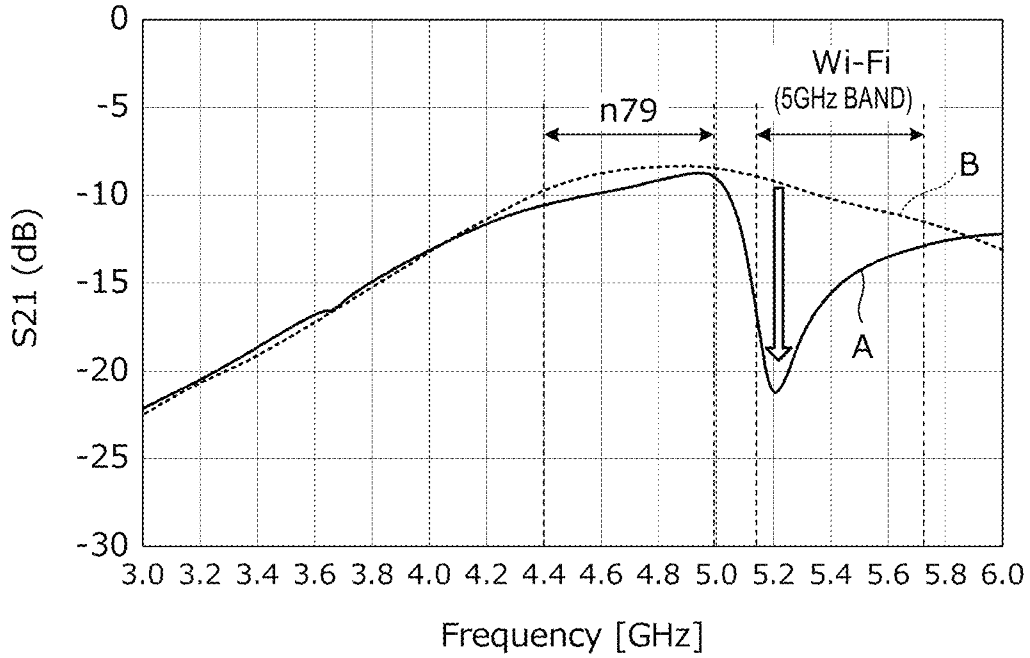
FIG. 4 is a graph showing frequency characteristics of a gain of a first antenna 1 according to the first preferred embodiment of the present invention.

FIG. 4 is a graph showing frequency characteristics of antenna-to-antenna isolation between the first antenna 1 and the second antenna 2 according to the present preferred embodiment. In FIG. 4, a characteristic curve A represents the frequency characteristics of the antenna-to-antenna isolation between the first antenna 1 and the second antenna 2 according to the present preferred embodiment, and the vertical axis represents S21 of the S parameters and the horizontal axis represents the frequency. In FIG. 4, a characteristic curve B is the frequency characteristics of the antenna-to-antenna isolation between the wideband antenna device and the second antenna 2 in the comparative example shown in FIG. 30.

The first antenna 1 in the present preferred embodiment is, for example, an antenna used in Band n79, and equal to or more than about −11 dB isolation is obtained over a wide band of about 4.4 GHz to about 5.0 GHz. On the other hand, the gain is equal to or less than about −21 dB at the low frequency end of an approximate 5 GHz band Wi-Fi. Accordingly, the isolation between the first antenna 1 and the second antenna 2 is ensured.

The reason why the above-described characteristics are obtained is as follows. As described above, in the communication band (about 5.15 GHz to about 5.725 GHz) of the second antenna 2, the phase difference between the signals of the first radiating element 11 and the second radiating element 12 is preferably in the range of, for example, about 180°±45°, which is close to about 180°. FIG. 2B illustrates a potential difference occurring between the open ends of the first radiating element 11 and the second radiating element 12, specifically in the communication band of the second antenna 2. When a feeding phase difference between the first radiating element 11 and the second radiating element 12 is close to about 180° and is in the range of about 180°±45°, the electric field coupling between the first radiating element 11 and the second radiating element 12 is very strong, and energy is transferred between the first radiating element 11 and the second radiating element 12. Therefore, emission of energy into the air is reduced or prevented. This result is shown in the characteristic curve A in FIG. 4.

In Band n79 which is the communication band of the first antenna 1, the phase difference between the first radiating element 11 and the second radiating element 12 is within a range of less than about ±135° at most, preferably less than about ±120°, more preferably less than about 90°, and still more preferably a range close to 0°, for example. Therefore, in Band n79, energy is not transferred, as compared to the characteristic curve B, between the first radiating element 11 and the second radiating element 12, and the first antenna 1 acts as a wideband antenna.

Figure 5A:
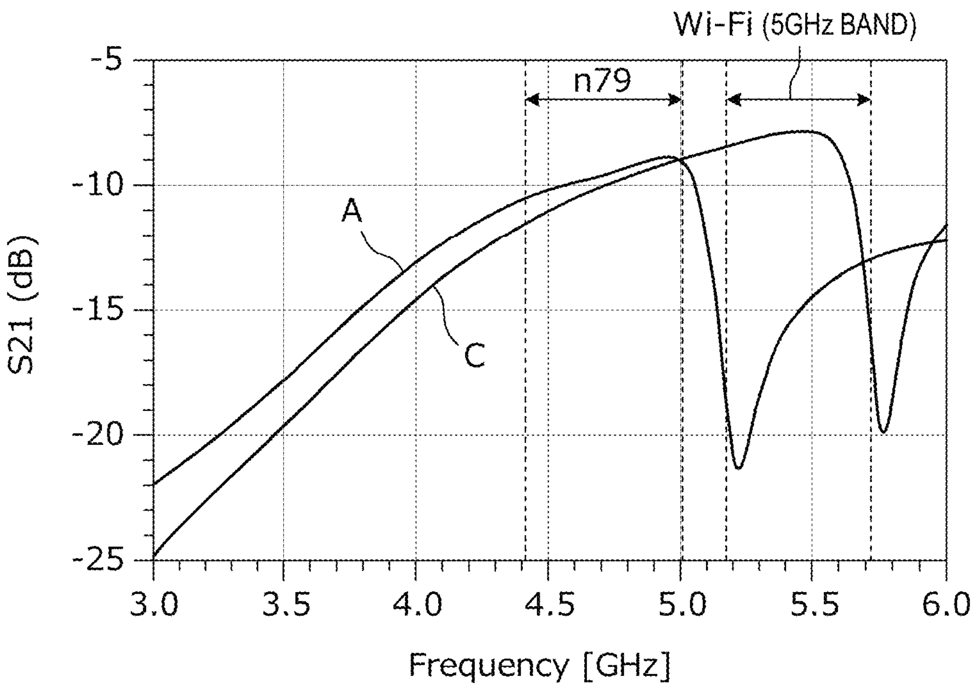
FIGS. 5A and 5B are graphs showing the frequency characteristics of the gain of the first antenna 1 depending on the presence/absence of mutual inductance M of the coupling element 3 included in the antenna device 101.
Figure 5B:
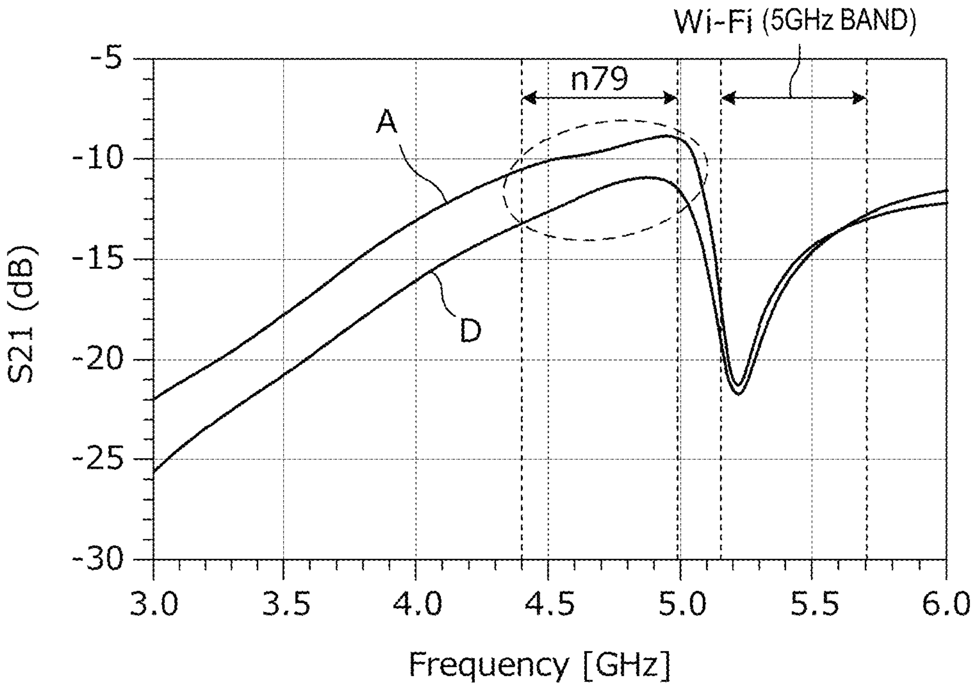

FIGS. 5A and 5B are diagrams showing the frequency characteristics of the antenna-to-antenna isolation between the first antenna 1 and the second antenna 2 depending on the presence/absence of mutual inductance M of the coupling element 3 included in the antenna device 101. In FIG. 5A, the characteristic curve A is the characteristic of the first antenna 1 in the present preferred embodiment, and a characteristic curve C is the characteristic of a first antenna 1 in a comparative example. In the first antenna 1 in the comparative example, the mutual inductance M between the primary coil L1 and the secondary coil L2 of the coupling element 3 is zero.

As shown in FIG. 5A, when the mutual inductance M between the primary coil L1 and the secondary coil L2 of the coupling element 3 is zero, the first radiating element 11 and the second radiating element 12 are coupled by electric field coupling only. In this state, the mutual inductance M does not contribute, and thus the second resonant frequency f2 becomes relatively high.

On the other hand, FIG. 5B shows a state in which the mutual inductance M becomes zero, and thus the rising second resonant frequency f2 is adjusted by another element (the second radiating element 12 or the secondary coil L2) so that the frequency at which the isolation is reduced coincides with each other. In FIG. 5B, the characteristic curve A is the characteristic of the first antenna 1 in the present preferred embodiment, and the characteristic curve D is the characteristic of the first antenna of the comparative example after the above-mentioned adjustment.

Figure 6:
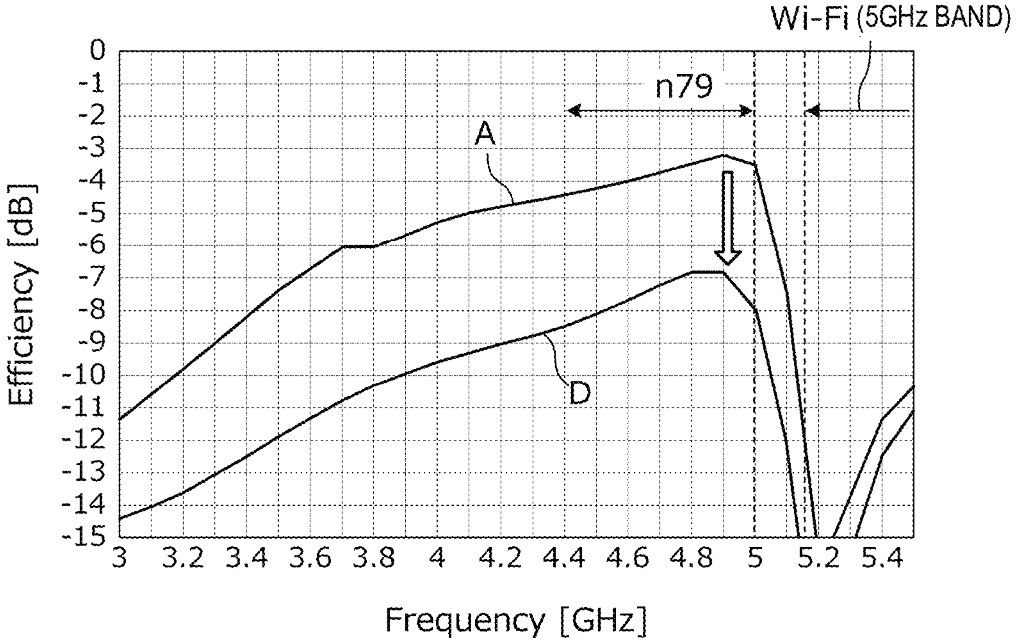
FIG. 6 is a graph showing frequency characteristics of radiation efficiency of the first antenna 1 in the antenna device of a first preferred embodiment and the first antenna in an antenna as a comparative example.

FIG. 6 is a graph showing the frequency characteristics of the first antenna 1 in the antenna device according to the first preferred embodiment and the frequency characteristics of radiation efficiency of the first antenna in the antenna in the comparative example. The vertical axis of FIG. 6 represents the radiation efficiency, and the horizontal axis represents the frequency. Here, the characteristic curve A is the characteristic of the first antenna 1 in the present preferred embodiment, and the characteristic curve D is the characteristic of the first antenna in the comparative example after the above-described adjustment. In this manner, when the first radiating element 11 and the second radiating element 12 are not coupled to each other using the coupling element 3, a radiation gain is significantly degraded in Band n79.

Thus, when the first radiating element 11 and the second radiating element 12 are not coupled to each other using the coupling element 3, a high radiation efficiency is not obtained in Band n79.

Figure 7:
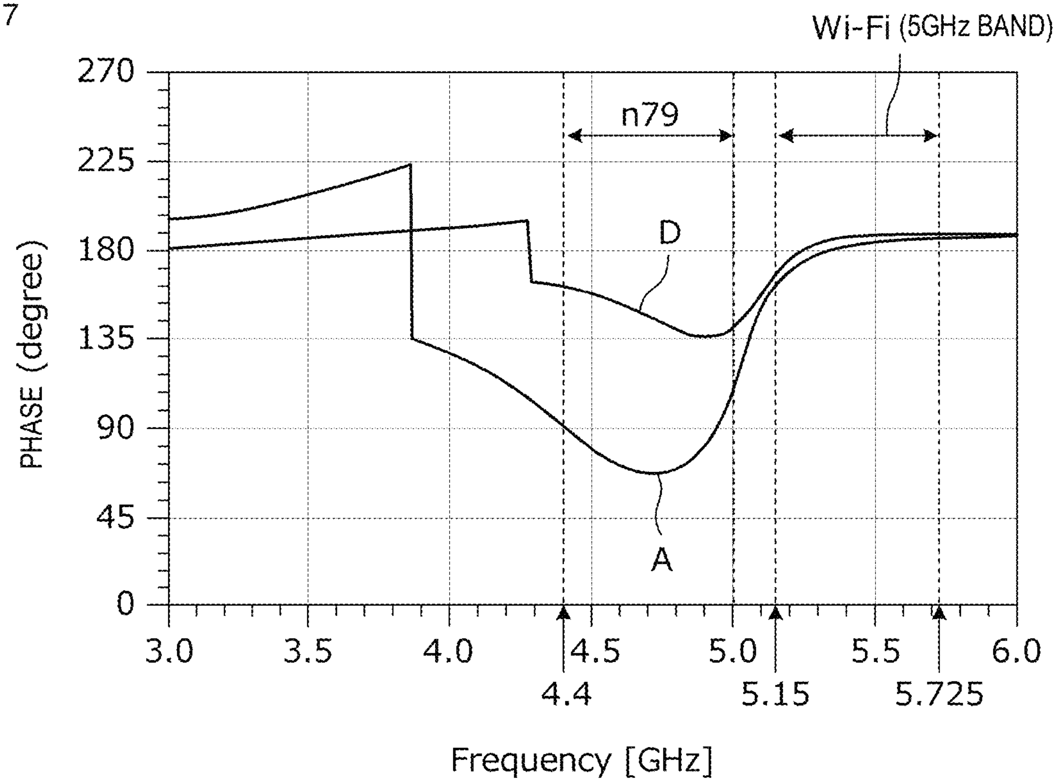
FIG. 7 is a graph showing frequency characteristics of feeding phase difference between a first radiating element 11 and a second radiating element 12.

FIG. 7 is a graph showing the frequency characteristics of the feeding phase difference between the first radiating element and the second radiating element 12. In FIG. 7, the characteristic curve A is a characteristic of the first antenna 1 in the present preferred embodiment, and a characteristic curve D is the characteristic of the first antenna in the comparative example after the above-mentioned adjustment. It is understood that in the first antenna 1 according to the present preferred embodiment, the feeding phase difference between the first radiating element 11 and the second radiating element 12 is less than about 135° over the frequencies of about 4.4 GHz to about 5.0 GHz, whereas the feeding phase difference between the first radiating element 11 and the second radiating element 12 is within the range of about 135° to about 180° over the frequencies of about 4.4 GHz to about 5.0 GHz in the first antenna in the comparative example, and the potential difference between the first radiating element 11 and the second radiating element 12 is large and the emission of energy into the air is reduced or prevented. In the first antenna 1 according to the present preferred embodiment, in Band n79, the phase difference between the signals of the first radiating element 11 and the second radiating element 12 is less than about ±135° due to the phase adjuster 13 and the mutual inductance of the coupling element 3, and therefore the radiation efficiency of the first antenna 1 is high.

In addition, in the antenna device 101 according to the present preferred embodiment, a fractional bandwidth of the band in which the first antenna 1 is used for communication and a fractional bandwidth of the band in which the second antenna 2 is used for communication are both about 10% or more, and the fractional bandwidth between the first antenna 1 and the second antenna 2 is about 5% or less. For example, in Band n79, the bandwidth is 5.0-4.4=0.6 GHz, and the center frequency thereof is about 4.7 GHz, so that the fractional bandwidth is 0.6/4.7=12%. In the 5 GHz band Wi-Fi of the IEEE 802.11ac standard, the bandwidth is about 5.725-5.15=0.575 GHz, and the center frequency thereof is about 5.437 GHz, and therefore, the fractional bandwidth is about 0.575/5.437=10%.

Further, the difference between the high frequency end of Band n79 and the low frequency end of 802.11ac is about 5.15-5.0=0.15 GHz, and the center frequency between both bands is about 5.075 GHz, and thus the fractional bandwidth between both bands is about 0.15/5.075=2.9%.

As described above, it is possible to ensure the antenna-to-antenna isolation even when two communication bands are wide bands and the bandwidth between the two communication bands is narrow such that the fractional bandwidth of the band in which the first antenna 1 is used for communication and the fractional bandwidth of the band in which the second antenna 2 is used for communication are both about 10% or more and the fractional bandwidth of a band between the communication band of the first antenna 1 and the communication band of the second antenna 2 is about 5% or less.

Second Preferred Embodiment

In a second preferred embodiment of the present invention, an antenna device in which the connection structure of a first feeding circuit with respect to a first radiating element 11 is different from the example described in the first preferred embodiment will be described.

Figure 8:
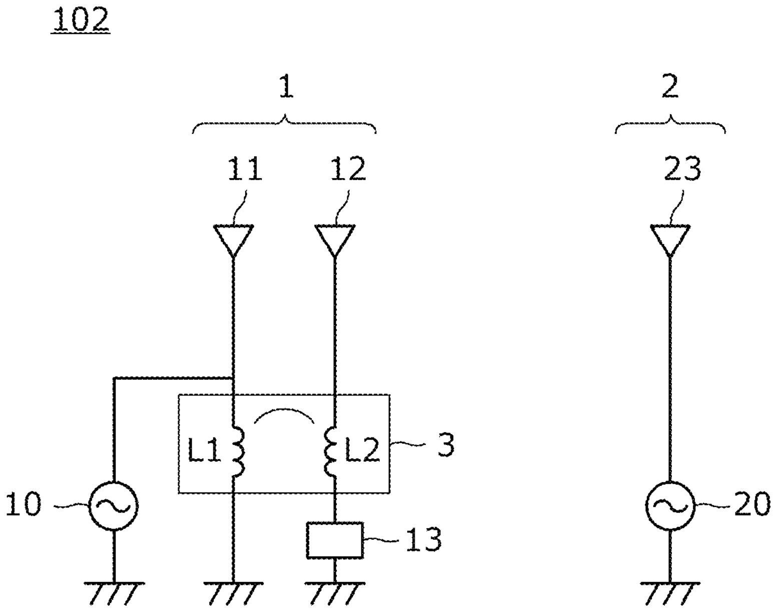
FIG. 8 is a circuit diagram of an antenna device according to a second preferred embodiment of the present invention.

FIG. 8 is a circuit diagram of the antenna device according to the second preferred embodiment. An antenna device 102 includes a first antenna 1 and a second antenna 2. The antenna device 102 includes the first feeding circuit 10 connected to a feeding unit of the first antenna 1, and a second feeding circuit 20 connected to a feeding unit of the second antenna 2.

The first antenna 1 includes a coupling element 3, a phase adjuster 13, a first radiating element 11, and a second radiating element 12. The coupling element 3 includes a primary coil L1 and a secondary coil L2 that are coupled to each other by magnetic field coupling.

The primary coil L1 is connected between the first radiating element 11 and the ground. One end of the first feeding circuit 10 is connected to a connection portion of the primary coil L1 to the first radiating element 11, and another end of the first feeding circuit 10 is connected to the ground. The secondary coil L2 is connected in series between the phase adjuster 13 and the second radiating element 12. Further, the phase adjuster 13 is connected between the secondary coil L2 and the ground.

In this way, the first feeding circuit 10 may be connected so that electric power is supplied to the connection point (connection range) between the primary coil L1 and the first radiating element 11.

Third Preferred Embodiment

In a third preferred embodiment of the present invention, several configuration examples of a first radiating element 11 are described.

FIG. 2A illustrates an example in which the first radiating element 11 is a monopole antenna or an inverted L-shaped antenna, but the first radiating element 11 is not limited thereto. FIG. 9, FIG. 10, FIG. 11, and FIG. 12 are circuit diagrams of the antenna device according to the third preferred embodiment. Each of the antenna devices includes a first antenna 1 and a second antenna 2. The first antenna 1 includes a coupling element 3, a phase adjuster 13, a first radiating element 11, and a second radiating element 12. The second antenna 2 includes a third radiating element 23. The configuration other than the first radiating element 11 is the same or substantially the same as that described in the first preferred embodiment.

Figure 9:
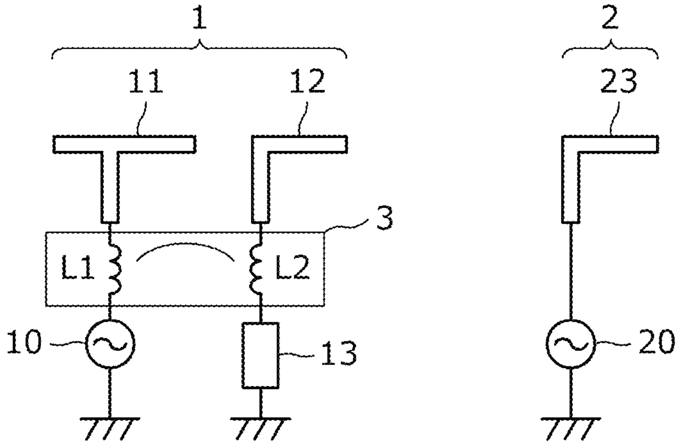
FIG. 9 is a circuit diagram of an antenna device according to a third preferred embodiment of the present invention.
Figure 10:
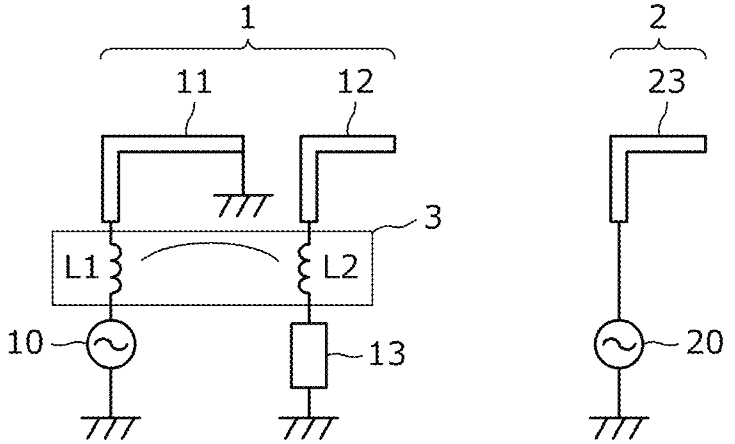
FIG. 10 is a circuit diagram of an antenna device according to the third preferred embodiment of the present invention.

In the example illustrated in FIG. 9, the first radiating element 11 is a branched antenna. According to this configuration, two or more resonant frequencies are provided for the first radiating element 11. In the example illustrated in FIG. 10, the first radiating element 11 is a loop antenna. That is, the first radiating element 11, a primary coil L1, and a first feeding circuit 10 define a loop.

Figure 11:
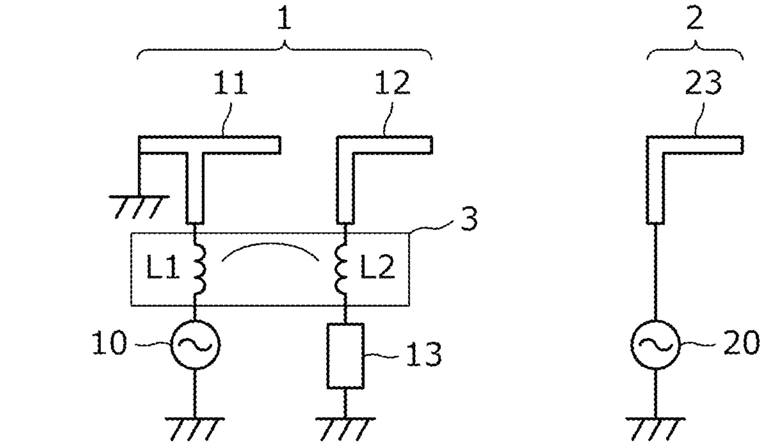
FIG. 11 is a circuit diagram of an antenna device according to the third preferred embodiment of the present invention.

In the example illustrated in FIG. 11, the first radiating element 11 is an inverted-F antenna. Typically, the inverted-F antenna includes a body extending in a lateral direction, a feeder connected to one end of the body, and a short-circuit wire connected to the middle of the body, but in this example, the inverted-F antenna is supplied with electric power from the short-circuit wire. That is, the feeder is grounded, and the first feeding circuit 10 is connected to the short-circuit wire with the primary coil L1 interposed therebetween.

Figure 12:
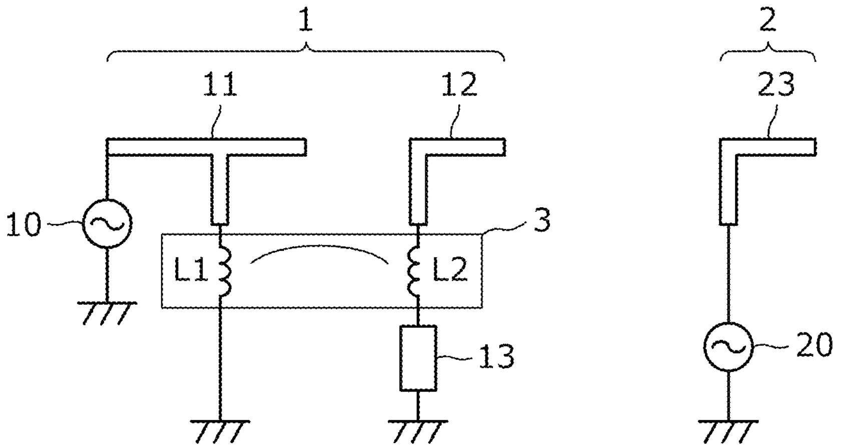
FIG. 12 is a circuit diagram of an antenna device according to the third preferred embodiment of the present invention.

Also, in the example illustrated in FIG. 12, the first radiating element 11 is the inverted-F antenna. In this example, the first feeding circuit 10 is connected to the feeder, and the primary coil L1 is connected between the short-circuit wire and the ground. The antenna device illustrated in FIG. 12 may be an example of the antenna device 102 illustrated in FIG. 8.

Fourth Preferred Embodiment

In a fourth preferred embodiment of the present invention, several configuration examples of a second radiating element 12 will be described.

FIG. 2A illustrates an example in which the second radiating element 12 is a monopole antenna or an inverted L-shaped antenna, but the second radiating element 12 is not limited thereto. FIG. 13, FIG. 14, FIG. 15, and FIG. 16 are circuit diagrams of an antenna device according to the fourth preferred embodiment. Each of the antenna devices includes a first antenna 1 and a second antenna 2. The first antenna 1 includes a coupling element 3, a phase adjuster 13, a first radiating element 11, and a second radiating element 12. The second antenna 2 includes a third radiating element 23. The configuration other than the second radiating element 12 is the same or substantially the same as that described in the first preferred embodiment.

Figure 13:
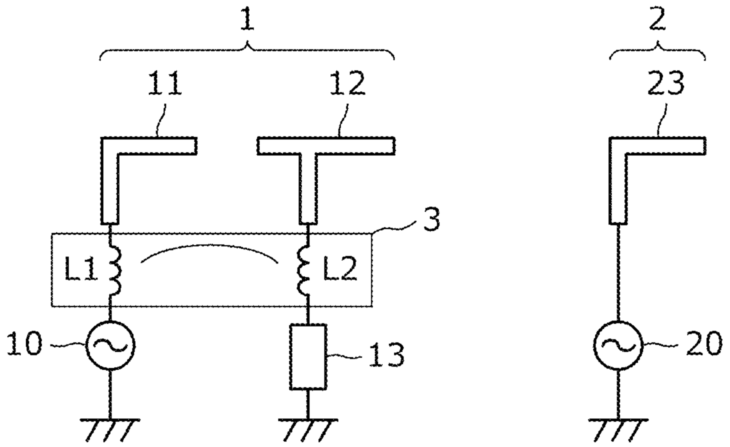
FIG. 13 is a circuit diagram of an antenna device according to a fourth preferred embodiment of the present invention.
Figure 14:
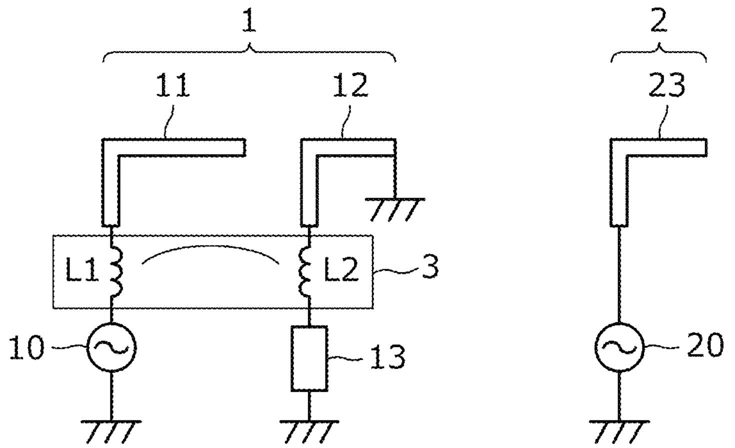
FIG. 14 is a circuit diagram of an antenna device according to the fourth preferred embodiment of the present invention.

In the example illustrated in FIG. 13, the second radiating element 12 is a branched antenna. With this configuration, two or more resonant frequencies are provided for the second radiating element 12. In the example illustrated in FIG. 14, the second radiating element 12 is a loop antenna. That is, the second radiating element 12, a secondary coil L2, and the phase adjuster 13 define a loop.

Figure 15:
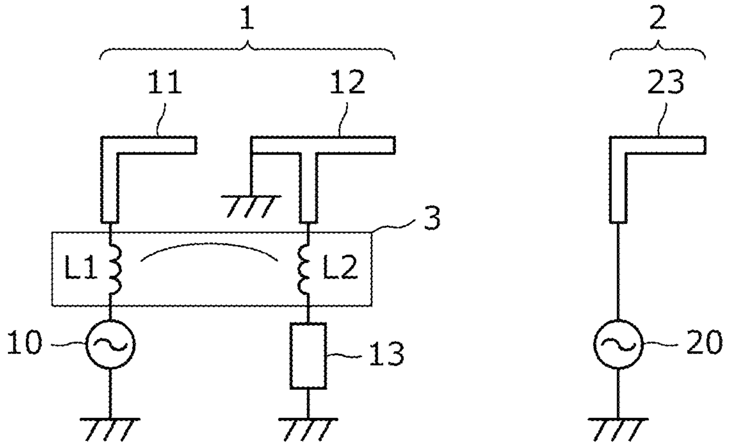
FIG. 15 is a circuit diagram of an antenna device according to the fourth preferred embodiment of the present invention.
Figure 16:
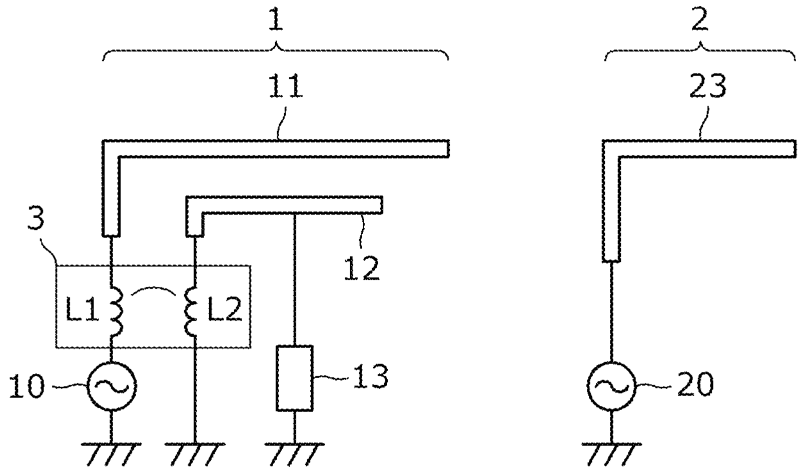
FIG. 16 is a circuit diagram of an antenna device according to the fourth preferred embodiment of the present invention.

In the example illustrated in FIG. 15, the second radiating element 12 is an inverted-F antenna. In this example, electric power is supplied from the short-circuit wire. That is, a feeder is connected to the ground, and the secondary coil L2 and the phase adjuster 13 are connected between the short-circuit wire and the ground. Also, in the example illustrated in FIG. 16, the second radiating element 12 is an inverted-F antenna. In this example, the secondary coil L2 is connected between the feeder and the ground, and the phase adjuster 13 is connected between the short-circuit wire and the ground.

Fifth Preferred Embodiment

In a fifth preferred embodiment of the present invention, several configuration examples of a third radiating element 23 will be described.

FIG. 2A illustrates an example in which the third radiating element 23 is a monopole antenna or an inverted L-shaped antenna, but the third radiating element 23 is not limited thereto. FIG. 17, FIG. 18, FIG. 19, and FIG. 20 are circuit diagrams of an antenna device according to the fifth preferred embodiment. Each of the antenna devices includes a first antenna 1 and a second antenna 2. The first antenna 1 includes a coupling element 3, a phase adjuster 13, a first radiating element 11, and a second radiating element 12. The second antenna 2 includes a third radiating element 23. The configuration other than the third radiating element 23 is the same or substantially the same as that described in the first preferred embodiment.

Figure 17:
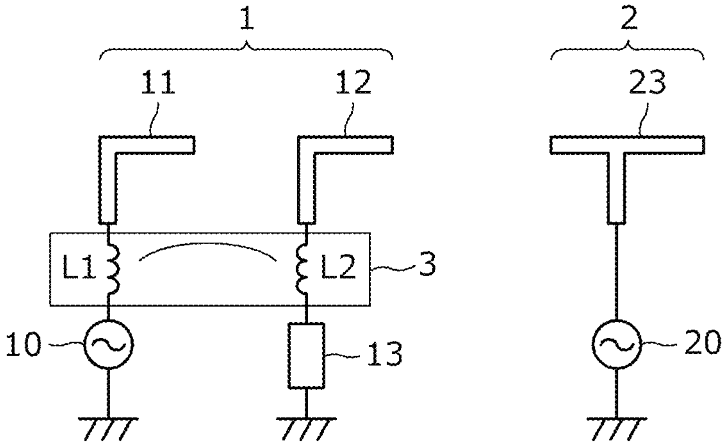
FIG. 17 is a circuit diagram of an antenna device according to a fifth preferred embodiment of the present invention.
Figure 18:
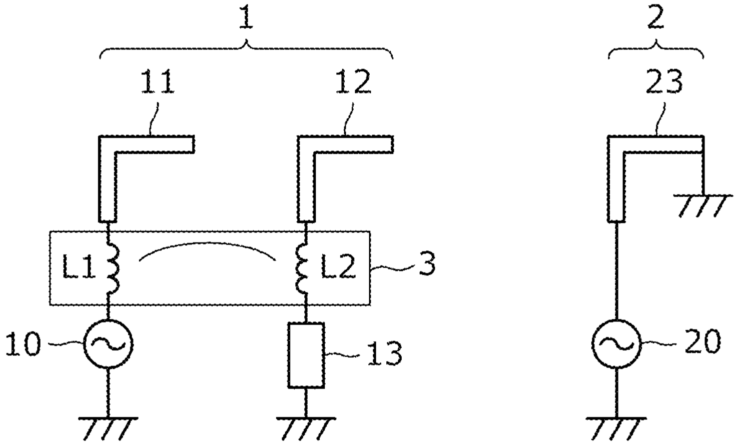
FIG. 18 is a circuit diagram of an antenna device according to the fifth preferred embodiment of the present invention.

In the example illustrated in FIG. 17, the third radiating element 23 is a branched antenna. With this configuration, two or more resonant frequencies are provided for the third radiating element 23. In the example illustrated in FIG. 18, the third radiating element 23 is a loop antenna. That is, the third radiating element 23 and a second feeding circuit 20 define a loop.

Figure 19:
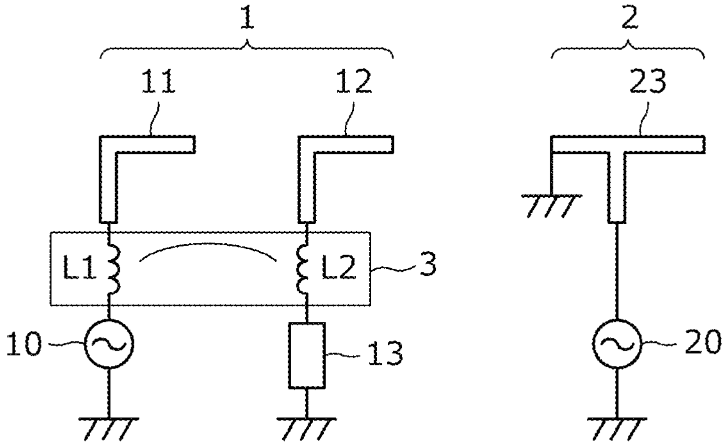
FIG. 19 is a circuit diagram of an antenna device according to the fifth preferred embodiment of the present invention.
Figure 20:
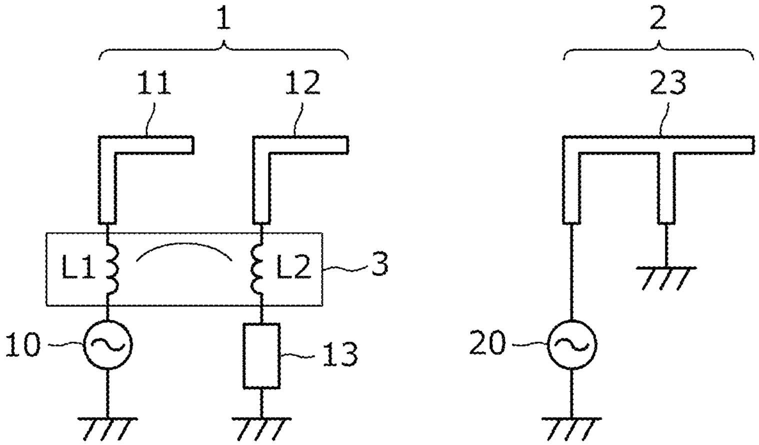
FIG. 20 is a circuit diagram of an antenna device according to the fifth preferred embodiment of the present invention.

In the example illustrated in FIG. 19, the third radiating element 23 is an inverted-F antenna. In this example, electric power is supplied from the short-circuit wire. That is, a feeder is grounded, and the second feeding circuit 20 is connected between the short-circuit wire and the ground. Also, in the example illustrated in FIG. 20, the third radiating element 23 is an inverted-F antenna. In this example, the second feeding circuit 20 is connected between the feeder and the ground.

Sixth Preferred Embodiment

In a sixth preferred embodiment of the present invention, an antenna device further including a parasitic radiating element will be exemplified.

Figure 21:
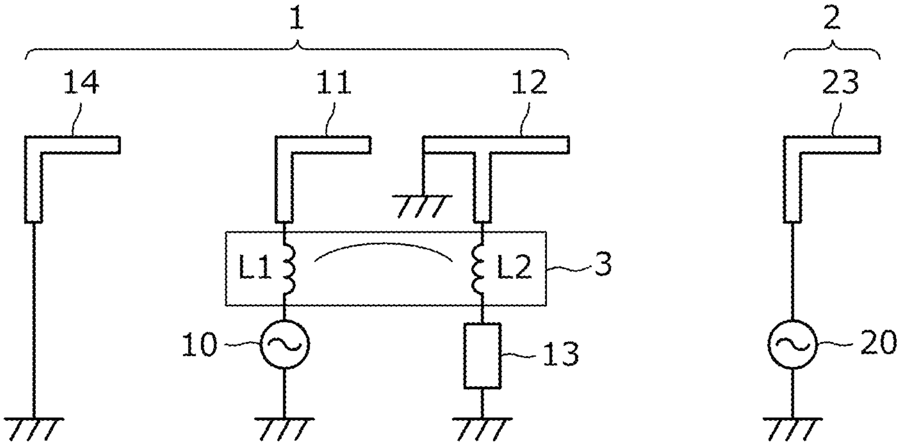
FIG. 21 is a circuit diagram of an antenna device according to a sixth preferred embodiment of the present invention.

FIG. 21 is a circuit diagram of an antenna device according to the sixth preferred embodiment. The antenna device includes a first antenna 1 and a second antenna 2. The first antenna 1 includes a coupling element 3, a phase adjuster 13, a first radiating element 11, a second radiating element 12, and a parasitic radiating element 14. The second antenna 2 includes a third radiating element 23. The configuration other than the parasitic radiating element 14 is the same or substantially the same as that illustrated in FIG. 15. The parasitic radiating element 14 and the first radiating element 11 are coupled by electric field coupling, and act as a portion of the first antenna 1. In the present preferred embodiment, an example is described in which the first antenna 1 includes the grounding parasitic radiating element 14 that resonates at a ½ wavelength. However, the configuration is not limited thereto, and the parasitic radiating element 14 may be the non-grounding radiating element that resonates at one wavelength. In addition, in the grounding parasitic element, the resonant frequency of the parasitic radiating element 14 may be adjusted by providing a reactance element between the parasitic radiating element 14 and the ground. The resonant frequency of the parasitic radiating element 14 is different from the resonant frequency (above-mentioned f1) of the first radiating element 11 and the resonant frequency (above-mentioned f2) of the second radiating element 12, and contributes to widening the bandwidth of the first antenna 1.

Figure 22:
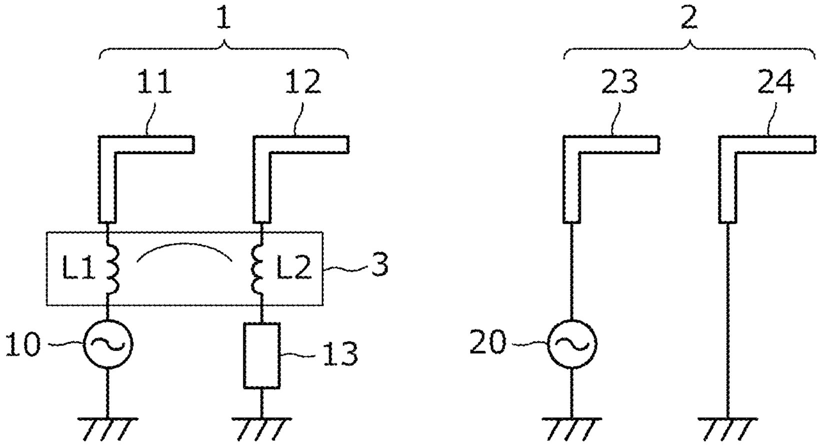
FIG. 22 is a circuit diagram of another antenna device according to the sixth preferred embodiment of the present invention.

FIG. 22 is a circuit diagram of another antenna device according to the sixth preferred embodiment. The antenna device also includes a first antenna 1 and a second antenna 2. The first antenna 1 includes a coupling element 3, a phase adjuster 13, a first radiating element 11, and a second radiating element 12. The second antenna 2 includes a third radiating element 23 and a parasitic radiating element 24. The configuration other than the parasitic radiating element 24 is the same or substantially the same as that described in the first preferred embodiment. The parasitic radiating element 24 and the third radiating element 23 are coupled by electric field coupling, and act as a portion of the second antenna 2. The resonant frequency of the parasitic radiating element 24 is different from the resonant frequency (above-mentioned f3) of the third radiating element 23, and contributes to widening the bandwidth of the second antenna 2.

Seventh Preferred Embodiment

In a seventh preferred embodiment of the present invention, an example of an antenna device in which a connection position of a phase adjuster 13 is different from that in the examples described thus far will be described.

Figure 23:
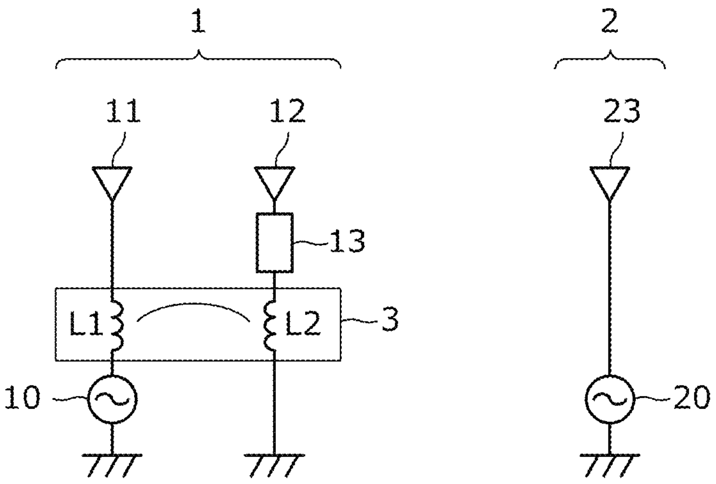
FIG. 23 is a circuit diagram of an antenna device according to a seventh preferred embodiment of the present invention.
Figure 24:
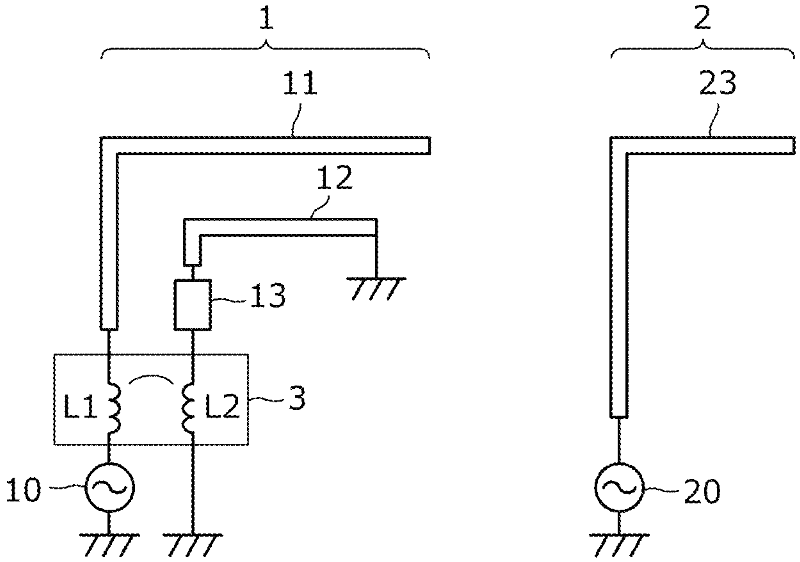
FIG. 24 is a circuit diagram of an antenna device according to the seventh preferred embodiment of the present invention including schematic illustration of each radiating element.

FIG. 23 is a circuit diagram of the antenna device according to the seventh preferred embodiment. FIG. 24 is a circuit diagram of the antenna device according to the seventh preferred embodiment including schematic illustration of each radiating element. The antenna device includes a first antenna 1 and a second antenna 2. The first antenna 1 includes a coupling element 3, the phase adjuster 13, a first radiating element 11, and a second radiating element 12. The second antenna 2 includes a third radiating element 23. The phase adjuster 13 is connected between the second radiating element 12 and the secondary coil L2, and the secondary coil L2 is connected between the phase adjuster and the ground. Other configurations are the same or substantially the same as those described in the first preferred embodiment.

The phase adjuster 13 includes a reactance element. The phase adjuster 13 has a higher phase adjustment effect when provided at a high current intensity position. In general, in the radiating element including an open end, the ground end has the maximum current intensity, and therefore, the phase adjuster 13 is preferably provided between the secondary coil L2 and the ground as in the examples described thus far.

However, as in the present preferred embodiment, the phase adjuster 13 may be provided between the second radiating element 12 and the secondary coil L2. In particular, as in the example illustrated in FIG. 24, when the second radiating element 12 is a loop antenna, the current intensity is also high between the second radiating element 12 and the secondary coil L2, and therefore, the phase adjuster 13 performs effectively.

Eighth Preferred Embodiment

Figure 25A:
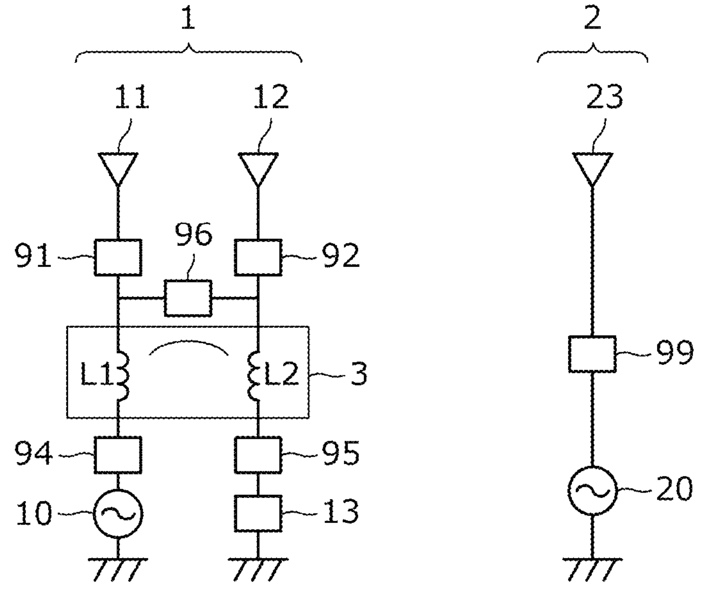
FIGS. 25A and 25B are circuit diagrams of antenna devices according to an eighth preferred embodiment of the present invention.
Figure 25B:
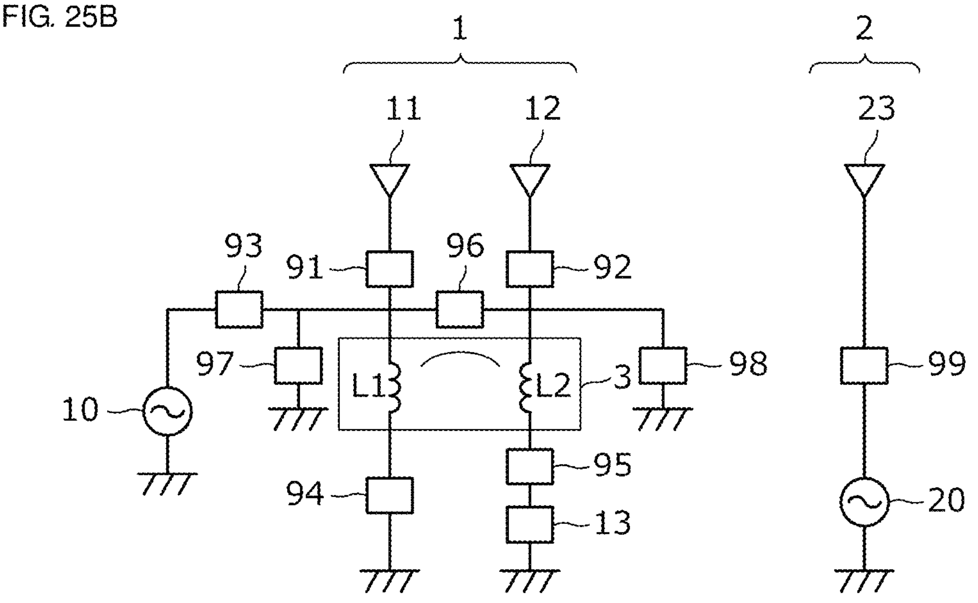

In an eighth preferred embodiment of the present invention, an antenna device including a matching circuit is exemplified. FIGS. 25A and 25B are circuit diagrams of the antenna device according to the eighth preferred embodiment. The antenna device illustrated in FIG. 25A includes a first antenna 1 and a second antenna 2, the first antenna 1 includes matching circuits 91, 92, 94, 95, and 96, and the second antenna 2 includes a matching circuit 99. The antenna device illustrated in FIG. 25B includes the first antenna 1 and the second antenna 2, the first antenna 1 includes matching circuits 91 to 98, and the second antenna 2 includes a matching circuit 99.

Figure 26A:
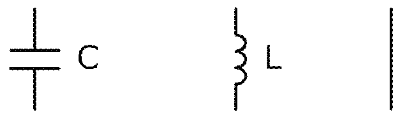
FIGS. 26A to 26C illustrate examples of configurations of matching circuits 91 to 99.
Figure 26B:
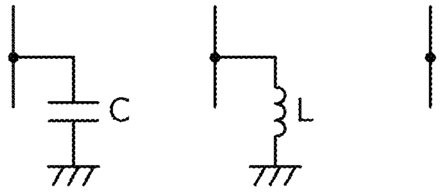
Figure 26C:
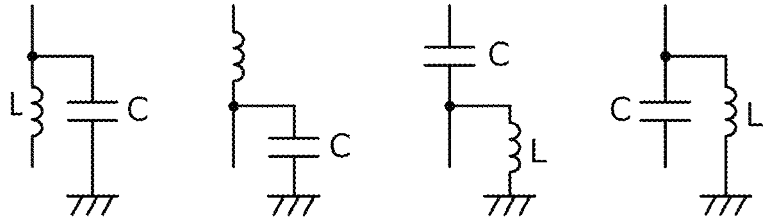

FIGS. 26A to 26C illustrate examples of the configuration of the matching circuits 91 to 99. When the circuits are connected in series, as illustrated in FIG. 26A, the configuration is a capacitor C, an inductor L, or a short circuit, when shunt-connected to the ground, as illustrated in FIG. 26B, the connection to the ground is shunt-connected with the capacitor C or the inductor L interposed therebetween, or shunt connection to the ground is not provided. Also, a combination of these may be used. For example, as illustrated in FIG. 26C, the inductor L is connected in series and the capacitor C is shunt-connected.

In FIG. 25A, the matching circuit 91 is connected between a primary coil L1 and a first radiating element 11, and the matching circuit 92 is connected between a secondary coil L2 and a second radiating element 12. The matching circuit 94 is connected between the primary coil L1 and a first feeding circuit 10, and the matching circuit 95 is connected between the secondary coil L2 and a phase adjuster 13. The matching circuit 96 is connected between the primary coil L1 and the secondary coil L2.

In FIG. 25A, the matching circuit 91 performs matching between the primary coil L1 and the first radiating element 11. The matching circuit 92 performs matching between the secondary coil L2 and the second radiating element 12. The matching circuit 94 performs matching between the primary coil L1 and the first feeding circuit 10. The matching circuit 95 performs matching between the secondary coil L2 and the phase adjuster 13. The matching circuit 96 performs matching between the primary coil L1 and the secondary coil L2. The matching circuit 99 of the second antenna performs matching between a third radiating element 23 and a second feeding circuit 20.

In FIG. 25B, the matching circuit 91 performs matching between the primary coil L1 and the first radiating element 11. The matching circuit 92 performs matching between the secondary coil L2 and the second radiating element 12. The matching circuit 95 performs matching between the secondary coil L2 and the phase adjuster 13. The matching circuit 96 performs matching between the primary coil L1 and the secondary coil L2. The matching circuit 97, together with the matching circuits 91, 93, and 94, performs matching between the first feeding circuit 10 and the primary coil L1. The matching circuit 98, together with the matching circuits 92 and 95, performs matching between the secondary coil L2 and the second radiating element 12. The matching circuit 99 of the second antenna performs matching between a third radiating element 23 and a second feeding circuit 20.

Ninth Preferred Embodiment

In a ninth preferred embodiment of the present invention, an antenna device including a matching circuit having a configuration different from that of the matching circuit described in the eighth preferred embodiment will be exemplified.

Figure 27:
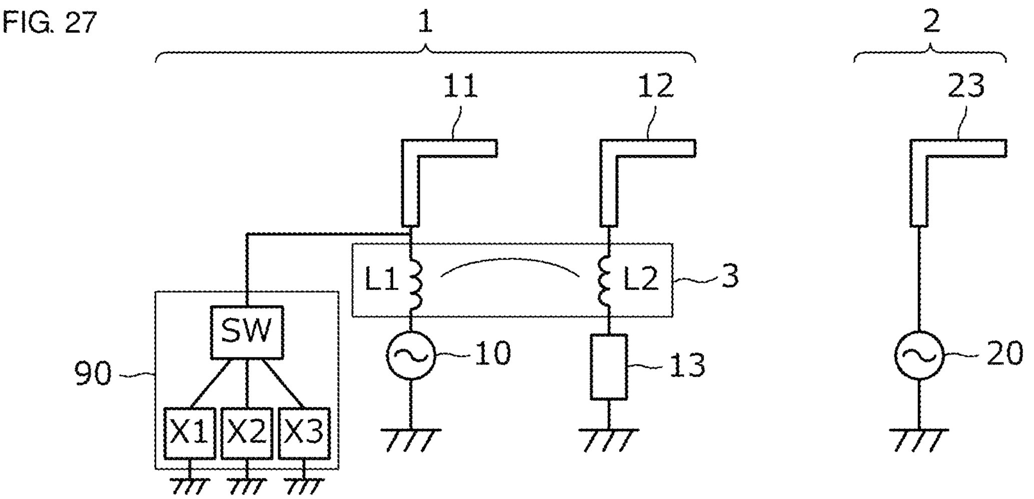
FIG. 27 is a circuit diagram of an antenna device according to a ninth preferred embodiment of the present invention.

FIG. 27 is a circuit diagram of an antenna device according to the ninth preferred embodiment. The antenna device includes a first antenna 1 and a second antenna 2, and a matching circuit 90 is connected between the ground and a connection portion between a primary coil L1 and a first radiating element 11. The configuration other than the matching circuit 90 is the same or substantially the same as that described in the first preferred embodiment and some other preferred embodiments.

The matching circuit 90 includes a plurality of reactance elements X1, X2, and X3, and a switch SW that selects the reactance elements. As described above, when the matching circuit 90 includes a plurality of reactance elements and a switch to select the reactance elements, connection between the connection portion, which is between the primary coil L1 and the first radiating element 11, and the reactance to be shunt-connected to the ground can be switched based on the selection by the switch SW, and further appropriate impedance matching can be achieved corresponding to a predetermined frequency band.

In the example illustrated in FIG. 27, the matching circuit 90 connected to the connection portion between the primary coil L1 and the first radiating element 11 has been exemplified, but the matching circuit 90 may be connected to other portions as illustrated in FIGS. 25A and 25B.

Tenth Preferred Embodiment

In a tenth preferred embodiment of the present invention, an electronic apparatus including an antenna device described above will be exemplified.

Figure 28:
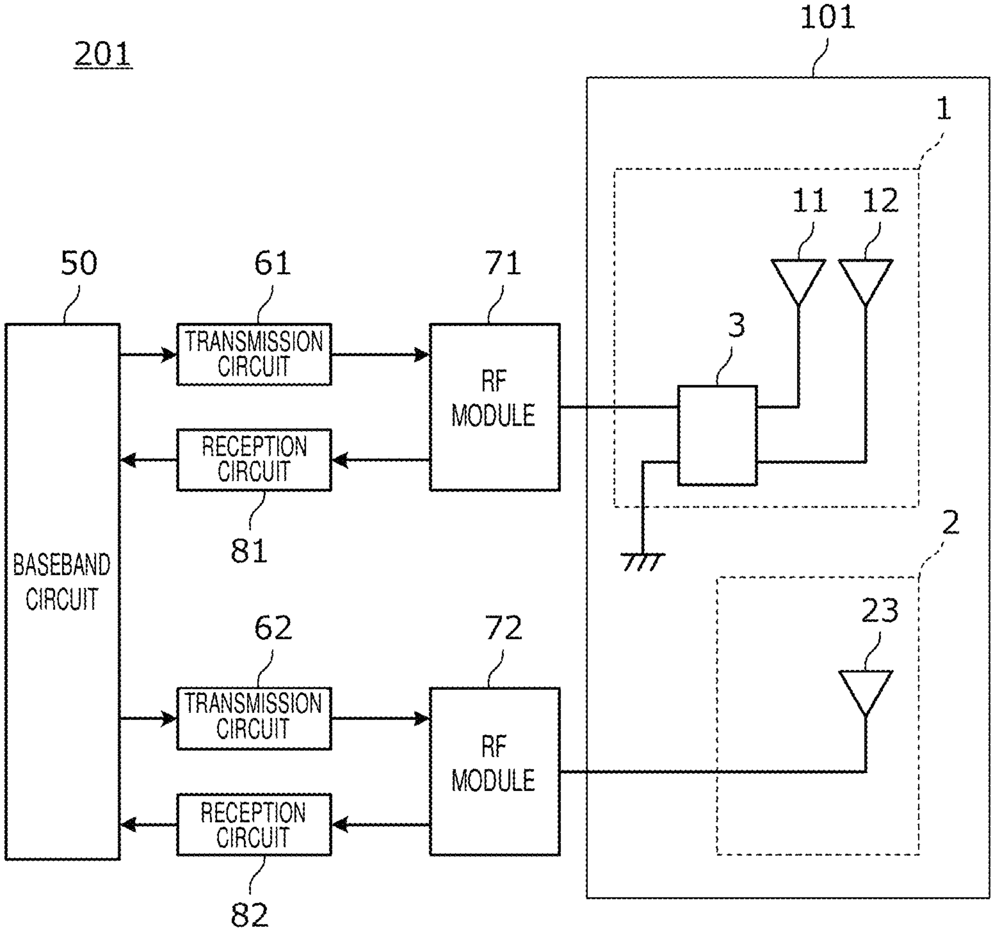
FIG. 28 is a block diagram of an electronic apparatus 201 according to a tenth preferred embodiment of the present invention.

FIG. 28 is a block diagram of an electronic apparatus 201 according to the tenth preferred embodiment. The electronic apparatus 201 is, for example, a mobile phone terminal, and includes an antenna device 101, RF modules 71 and 72, transmission circuits 61 and 62, reception circuits 81 and 82, and a baseband circuit 50. The antenna device 101 includes a coupling element 3, a first radiating element 11, a second radiating element 12, and a third radiating element 23. The RF module 71 is a circuit that switches between a transmission signal and a reception signal of a mobile phone communication signal. The transmission circuit 61 is a mobile phone transmission circuit, and the reception circuit 81 is a mobile phone reception circuit. Further, the RF module 72 is a circuit to switch between a transmission signal and a reception signal for a wireless LAN. The transmission circuit 62 is for a wireless LAN, and the reception circuit 82 is for a wireless LAN.

The present invention is not limited to the above-described preferred embodiments. Modifications and variations can be appropriately made by those skilled in the art. The scope of the present invention is determined by the claims rather than by the foregoing preferred embodiments. Further, the scope of the present invention includes modifications and variations from the preferred embodiments within the equivalent of the scope of the claims.

For example, the primary coil L1 and the secondary coil L2 are not limited to coils included in a single element, and may be separate elements that individually act as a coil.

In the preferred embodiments described above, an example is described in which the parasitic radiating element is the grounding radiating element that resonates at a ½ wavelength. However, the configuration is not limited thereto, and the parasitic radiating element may be a non-grounding radiating element that resonates at one wavelength. In addition, in order to adjust the impedance, the resonant frequency, and the like, an adjustment circuit including at least one reactance element may be added to each of the radiating elements.

Also, "connected" in the "phase adjuster connected to the second radiating element" described in this disclosure is not limited to "connected" where the phase adjuster 13 is directly connected to the second radiating element 12, and is an expression including indirectly "connected" such that the secondary coil L2 is connected between the second radiating element 12 and the phase adjuster 13, for example. Similarly, "connected" in the "first radiating element connected to the primary coil" is not limited to "connected" where the primary coil L1 is directly connected to the first radiating element 11, and is an expression including indirectly "connected" where another element or circuit, such as a matching circuit, is connected between the first radiating element 11 and the primary coil L1. The same applies to the "second radiating element connected to the secondary coil". That is, "connected" is not limited to "connected" where the secondary coil L2 is directly connected to the second radiating element 12, and includes indirectly "connected" where another element or circuit, such as the phase adjuster 13, the matching circuit, or the like is connected between the second radiating element 12 and the secondary coil L2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:

a first antenna; and a second antenna; wherein the first antenna includes a coupling element including a primary coil and a secondary coil, a first radiating element connected to the primary coil, a second radiating element connected to the secondary coil, and a phase adjuster connected to the second radiating element;

the second antenna includes a third radiating element;

a first feeding circuit is connected to a primary coil side;

a second feeding circuit is connected to the third radiating element; and the phase adjuster is provided to adjust a phase difference between signals of the first radiating element and the second radiating element in a communication band of the second antenna to be within a range of about 180°±45°.

2. The antenna device according to claim 1, wherein a phase difference between signals of the first radiating element and the second radiating element in a communication band of the first antenna is less than about 135°.

3. The antenna device according to claim 1, wherein a fractional bandwidth of a communication band of the first antenna and a fractional bandwidth of the communication band of the second antenna are both about 10% or more, and a fractional bandwidth of a band between the communication bands of the first antenna and the second antenna is about 5% or less.

4. The antenna device according to claim 1, wherein the primary coil and the secondary coil are included in a single element.

5. The antenna device according to claim 1, further comprising a matching circuit connected to at least one of the first radiating element, the second radiating element, or the third radiating element.

6. The antenna device according to claim 5, wherein the matching circuit includes a plurality of reactance elements and a switch to select the reactance elements.

7. The antenna device according to claim 1, wherein the phase adjuster is connected between the secondary coil and a reference potential end.

8. The antenna device according to claim 1, wherein the first radiating element is an inverted-F antenna including a feeder and a short-circuit wire, and the primary coil is connected between the short-circuit wire of the inverted-F antenna and a reference potential end.

9. The antenna device according to claim 1, further comprising a parasitic radiating element coupled to the first radiating element or the third radiating element.

10. The antenna device according to claim 1, wherein
the first antenna resonates at a first resonant frequency;
the second antenna resonates at a second resonant frequency;
the third antenna resonates at a third resonant frequency;
the first resonant frequency, the second resonant frequency, and the third resonant frequency are included in 5 GHz bands.

11. The antenna device according to claim 10, wherein the first resonant frequency and the second resonant frequency are frequencies in a communication frequency band for a mobile phone, and the third resonant frequency is a frequency in a frequency band used in a wireless LAN.

12. The antenna device according to claim 11, wherein the first antenna is used in Band n79 of 3GPP standard, and the second antenna is used in a 5 GHz band of IEEE 802.11 standard.

13. The antenna device according to claim 12, wherein a phase difference between the first radiating element and the second radiating element is less than about 120° in a communication band of the first antenna.

14. An electronic apparatus comprising:
an antenna device;
a first feeding circuit connected to the antenna device; and
a second feeding circuit connected to the antenna device; wherein
the antenna device includes a first antenna and a second antenna;
the first antenna includes a coupling element including a primary coil and a secondary coil, a first radiating element connected to the primary coil, a second radiating element connected to the secondary coil, and a phase adjuster connected to the second radiating element;
the second antenna includes a third radiating element;
a first feeding circuit is connected to a primary coil side;
a second feeding circuit is connected to the third radiating element; and
the phase adjuster is provided to adjust a phase difference between signals of the first radiating element and the second radiating element in a communication band of the second antenna to be within a range of about 180°±45°.

15. The electronic apparatus according to claim 14, wherein a phase difference between signals of the first radiating element and the second radiating element in a communication band of the first antenna is less than about 135°.

16. The electronic apparatus according to claim 14, wherein a fractional bandwidth of a communication band of the first antenna and a fractional bandwidth of the communication band of the second antenna are both about 10% or more, and a fractional bandwidth of a band between the communication bands of the first antenna and the second antenna is about 5% or less.

17. The electronic apparatus according to claim 14, wherein the primary coil and the secondary coil are included in a single element.

18. The electronic apparatus according to claim 14, further comprising a matching circuit connected to at least one of the first radiating element, the second radiating element, or the third radiating element.

19. The electronic apparatus according to claim 18, wherein the matching circuit includes a plurality of reactance elements and a switch to select the reactance elements.

20. The electronic apparatus according to claim 14, wherein the phase adjuster is connected between the secondary coil and a reference potential end.

* * * * *